United States Patent
Sun et al.

(10) Patent No.: US 12,269,985 B1
(45) Date of Patent: Apr. 8, 2025

(54) HIGH DENSITY ENVIRONMENTALLY FRIENDLY POLYMER WATER-BASED DRILLING FLUID WITH RESISTANCE TO 240° C. AND SATURATED SALTS, PREPARATION METHOD THEREFOR AND USE THEREOF

(71) Applicant: China University of Petroleum (East China), Qingdao (CN)

(72) Inventors: Jinsheng Sun, Qingdao (CN); Jingping Liu, Qingdao (CN); Kaihe Lv, Qingdao (CN); Meichun Li, Qingdao (CN); Jiafeng Jin, Qingdao (CN); Jintang Wang, Qingdao (CN); Yuanwei Sun, Qingdao (CN); Taifeng Zhang, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/951,901

(22) Filed: Nov. 19, 2024

(30) Foreign Application Priority Data

Aug. 21, 2024 (CN) .......................... 202411151885.5

(51) Int. Cl.
*C09K 8/24* (2006.01)
*C09K 8/508* (2006.01)
*C09K 8/512* (2006.01)
*E21B 21/06* (2006.01)

(52) U.S. Cl.
CPC .............. *C09K 8/24* (2013.01); *C09K 8/5086* (2013.01); *C09K 8/512* (2013.01); *E21B 21/062* (2013.01); *C09K 2208/10* (2013.01)

(58) Field of Classification Search
CPC ........ C09K 8/24; C09K 8/5086; C09K 8/512; C09K 2208/10; E21B 21/062
See application file for complete search history.

(56) References Cited

U.S. PATENT DOCUMENTS

| | | | | |
|---|---|---|---|---|
| 6,544,689 | B1 * | 4/2003 | Riley | ............... H01M 10/0525 |
| | | | | 429/304 |
| 9,701,884 | B1 * | 7/2017 | Sun | ........................ C09K 8/516 |
| 9,809,740 | B2 * | 11/2017 | Chakraborty | ......... E21B 43/267 |
| 2010/0216942 | A1 * | 8/2010 | Lohmeijer | .............. C04B 26/32 |
| | | | | 524/588 |
| 2017/0218261 | A1 * | 8/2017 | Nguyen | ................... E21B 43/25 |
| 2020/0332423 | A1 * | 10/2020 | Dhawan | ................ C23F 11/173 |
| 2021/0054263 | A1 * | 2/2021 | Saini | ..................... E21B 43/267 |
| 2024/0174780 | A1 * | 5/2024 | Katayama | ................ C09D 7/65 |
| 2024/0327562 | A1 * | 10/2024 | Owsik | ...................... C08G 8/04 |

FOREIGN PATENT DOCUMENTS

| | | |
|---|---|---|
| CN | 104559968 A | 4/2015 |
| CN | 108641683 A | 10/2018 |
| CN | 114891489 A | 8/2022 |

* cited by examiner

*Primary Examiner* — Alicia Bland
(74) *Attorney, Agent, or Firm* — Calfee, Halter & Griswold LLP

(57) ABSTRACT

The present disclosure relates to the technical field of drilling fluid, and discloses a high density environmentally friendly polymer water-based drilling fluid with resistance to 240° C. and saturated salts, a preparation method therefor and use thereof. The water-based drilling fluid comprises a micro-crosslinked heterocyclic polymer filtrate reducer, a hyper-branched strongly adsorbed filtrate reducer, a nanometer intercalated complex shearing potentiator, a flexible outer and rigid inner microsphere plugging agent, and water, wherein the micro-crosslinked heterocyclic polymer filtrate reducer is prepared by reacting sodium p-styrene sulfonate, N,N,N-trimethyl-3-(2-methylallylamino)-1-propyl ammonium chloride, N,N-diethyl acrylamide, N-vinyl caprolactam, tetramethyl ethylenediamine with phenyl triethoxy silane. The high density environmentally friendly polymer water-based drilling fluid with resistance to 240° C. and saturated salts of the present disclosure can exhibit good performance at high temperature and high salinity conditions, and has desirable weighting capability, it can meet the requirements of drilling well in the deep oil and gas formations.

18 Claims, No Drawings

HIGH DENSITY ENVIRONMENTALLY FRIENDLY POLYMER WATER-BASED DRILLING FLUID WITH RESISTANCE TO 240° C. AND SATURATED SALTS, PREPARATION METHOD THEREFOR AND USE THEREOF

CROSS-REFERENCE TO RELATED APPLICATIONS

The application claims priority to Chinese Application No. 202411151885.5, filed on Aug. 21, 2024, entitled "High density environmentally friendly polymer water-based drilling fluid with resistance to 240° C. and saturated salts, Preparation method therefor and Use thereof," which is herein specifically and entirely incorporated by reference.

FIELD

The present disclosure relates to the technical field of drilling fluid, in particular to a high density environmentally friendly polymer water-based drilling fluid with resistance to 240° C. and saturated salts, a preparation method therefor and use thereof.

BACKGROUND

The drilling fluid is an indispensable key technology for safeguarding the safe and efficient exploration and development of ultra-deep and extremely deep oil and gas formations, and the properties of the drilling fluid determine the safety, efficiency, and success or failure of the drilling well. But the ultra-deep drilling fluid confronts with unprecedented significant challenges: ultra-high temperature (more than or equal to 200° C.), ultra-high pressure (larger than or equal to 140 MPa), ultra-high salinity (more than or equal to 200,000 mg/L), and ultra-high stress (larger than or equal to 160 MPa), each of which is recognized as a worldwide problem, and the superposition of four challenges are almost insurmountable, it is difficult to control properties of the drilling fluid under the stringent conditions, thereby causing accidents such as well collapse, well leakage and blowout, the costs of drilling an ultra-deep and extremely-deep well reach 100 million yuan or even hundreds of millions yuan in China, once an accident occurs, it will cause huge economic loss, and even evolve into a catastrophic accident with "destroyed well and many casualties". At present, the drying fluids that can resist ultra-high temperature, ultra-high pressure, and saturated salts are deficient, in particular, the high density (2.4 g/cm$^3$) environment-friendly polymer water-based drying fluid with resistance to 240° C. and saturated salinity (36% NaCl) is an international blank. Therefore, it is highly urgent to prepare a high-density environment-friendly polymer water-based drilling fluid with resistance to 240° C. and saturated salts.

Chinese patent application CN108641683A discloses a high-temperature-resistant and high-mineralization-resistant high-density water-based drilling fluid and application thereof, but the high-temperature and high-pressure filtrate loss of the system is 21.6 mL under the conditions of saturated salts and the high temperature of 220° C., and the properties of said drilling fluid need to be improved. Chinese patent application CN104559968A discloses a high-temperature resistant water-based drilling fluid and a preparation method thereof, the system consists of basic mud and asphaltic liquid with a high softening point, however, the water-based drilling fluid can only resist the temperature of 150° C., and a large amount of sulfonated materials are added into the system, thus the environmental protection performance is poor. Chinese patent application CN114891489A discloses a non-sulfonated high-temperature-resistant water-based drilling fluid, wherein the drilling fluid system does not contain a sulfonated material, it is safe and environment-friendly, can resist temperatures more than 200° C., but the water-based drilling fluid does not show the salt resistance. The above-mentioned drilling fluids cannot satisfy the requirements of high-temperature resistance, salt resistance, and environmental protection simultaneously, they can hardly provide support for drilling wells in the deep oil and gas formations.

The existing water-based drilling fluids are generally unstable under the condition of ultra-high temperature and hypersalinity, cannot maintain good performances (e.g., rheology, filtrate loss) under the condition of ultra-high temperature, hypersalinity, and high density, and cannot meet the requirement of oil and gas drilling in the deep stratum.

SUMMARY

The present disclosure aims to solve the problems in the prior art that the water-based drilling fluids cannot simultaneously meet the requirements of ultra-high temperature resistance, ultra-high pressure resistance, saturated salt resistance, and environmental protection and provides a high-density environment-friendly polymer water-based drilling fluid with resistance to 240° C. and saturated salts, and a preparation method therefor and use thereof. The water-based drilling fluid in the present disclosure can maintain desirable properties for a long time (more than 10 days) under the conditions of 240° C., saturated salinity (36% NaCl), 5% CaCl$_2$, and 10% KCl, and can provide technical support for ultra-deep stratum oil and gas drilling.

To achieve the above objects, the first aspect of the present disclosure provides a water-based drilling fluid comprising a micro-crosslinked heterocyclic polymer filtrate reducer, a hyper-branched strongly adsorbed filtrate reducer, a nanometer intercalated complex shearing potentiator, a flexible outer and rigid inner microsphere plugging agent, and water, wherein the micro-crosslinked heterocyclic polymer filtrate reducer is prepared by reacting sodium p-styrene sulfonate, N,N,N-trimethyl-3-(2-methylallylamino)-1-propyl ammonium chloride, N,N-diethyl acrylamide, N-vinyl caprolactam, tetramethyl ethylenediamine with phenyl triethoxy silane; the hyper-branched strongly adsorbed polymer filtrate reducer is prepared by reacting 2-acrylamido-2-methylpropanesulfonic acid, dimethyldiallyl ammonium chloride, 1-vinylimidazole, modified alkylene polyoxyethylene ether with a branching agent.

Preferably, the content of said micro-crosslinked heterocyclic polymer filtrate reducer is 1-10 parts by weight, the content of said hyper-branched strongly adsorbed filtrate reducer is 0.5-8 parts by weight, the content of said nanometer intercalated complex shearing potentiator is 0.1-6 parts by weight, and the content of said flexible outer and rigid inner microsphere plugging agent is 1-15 parts by weight, relative to 100 parts by weight of water.

More preferably, the content of said micro-crosslinked heterocyclic polymer filtrate reducer is 4-6 parts by weight, the content of said hyper-branched strongly adsorbed filtrate reducer is 2-4 parts by weight, the content of said nanometer intercalated complex shearing potentiator is 1-4 parts by weight, and the content of said flexible outer and rigid inner microsphere plugging agent is 6-10 parts by weight, relative to 100 parts by weight of water.

Preferably, the molar ratio of sodium p-styrene sulfonate, N,N,N-trimethyl-3-(2-methylallylamino)-1-propyl ammonium chloride, N,N-diethyl acrylamide, N-vinyl caprolactam, and tetramethyl ethylenediamine is 1:(0.7-0.9):(0.5-0.7):(0.2-0.4):(0.01-0.03), during the preparation process of the micro-crosslinked heterocyclic polymer filtrate reducer.

More preferably, the micro-crosslinked heterocyclic polymer filtrate reducer is prepared by a method comprising the following steps:
(1-1) Mixing sodium p-styrene sulfonate, N,N,N-trimethyl-3-(2-methylallylamino)-1-propyl ammonium chloride, N,N-diethyl acrylamide, N-vinyl caprolactam, tetramethyl ethylenediamine, and water to obtain an aqueous solution with a monomer concentration of 20-40 wt %;
(1-2) Blending the aqueous solution with phenyl triethoxy silane under an inert atmosphere, and then introducing an initiator to carry out the reaction.

Further preferably, the phenyl triethoxy silane is used in an amount of 0.05-0.2 wt % of the total usage of monomer in step (1-1).

Preferably, the molar ratio of 2-acrylamido-2-methylpropanesulfonic acid, dimethyldiallyl ammonium chloride, 1-vinylimidazole, modified alkylene polyoxyethylene ether is 1:(0.4-0.6):(0.2-0.4):(0.04-0.06), during the preparation process of the hyper-branched strongly adsorbed filtrate reducer.

Preferably, during the preparation process of the hyper-branched strongly adsorbed filtrate reducer, the branching agent is used in an amount of 0.08-0.12 parts by weight, based on 100 parts by weight of the total usage of 2-acrylamido-2-methylpropane sulfonic acid, dimethyldiallyl ammonium chloride, 1-vinylimidazole, and modified alkylene polyoxyethylene ether.

Preferably, the branching agent is a mixture of branched polyethyleneimine having a molecular weight of 600-2,000 and N,N,N',N'-tetramethyl ethylenediamine.

Preferably, the mass ratio of the branched polyethyleneimine to the N,N,N',N'-tetramethyl ethylenediamine in the branching agent is 1:(0.04-0.06).

More preferably, the hyper-branched strongly adsorbed filtrate reducer is prepared with a method comprising the following steps:
(2-1) Mixing 2-acrylamido-2-methylpropanesulfonic acid, dimethyldiallyl ammonium chloride, 1-vinylimidazole, modified alkylene polyoxyethylene ether, and water to obtain an aqueous solution with a monomer concentration of 30-40 wt %;
(2-2) Subjecting the aqueous solution to the polymerization reaction in the presence of a first initiator under an inert atmosphere;
(2-3) Blending the mixture obtained after the reaction in step (2-2) with the branching agent, and then introducing a second initiator to carry out the reaction.

Preferably, the nanometer intercalated complex shearing potentiator is prepared with a method comprising the following steps:
(3-1) Dispersing nanometer lithium saponite and attapulgite clay according to a mass ratio of 1:(0.2-0.4) in water to obtain a dispersion liquid with a concentration of 5-10%;
(3-2) Mixing the dispersion liquid, N-isopropyl acrylamide, and maleic anhydride, and then introducing an initiator under an inert atmosphere to perform the reaction.

More preferably, the N-isopropyl acrylamide is used in an amount of 10-20 parts by weight, and the maleic anhydride is used in an amount of 5-15 parts by weight, relative to 100 parts by weight of the dispersion liquid.

Preferably, the flexible outer and rigid inner microsphere plugging agent is prepared with a method comprising the following steps:
(4-1) Mixing sodium p-styrene sulfonate, 4-acryloylmorpholine, dodecylphenol polyoxyethylene ether, and water to obtain a mixed aqueous solution;
(4-2) Blending the mixed aqueous solution with a silane coupling agent-modified nano-silica to obtain mixture a;
(4-3) Blending α-methyl styrene, lauryl methacrylate, and divinyl benzene to obtain mixture b, subsequently dropwise adding the mixture b to the mixture a with stirring to form an emulsion;
(4-4) Subjecting the emulsion to a deoxidization process, and then introducing an initiator to carry out the reaction.

More preferably, α-methyl styrene is used in an amount of 10-20 parts by weight, the lauryl methacrylate is used in an amount of 5-10 parts by weight, the sodium p-styrene sulfonate is used in an amount of 5-10 parts by weight, the 4-acryloylmorpholine is used in an amount of 5-10 parts by weight, the silane coupling agent-modified nano-silica is used in an amount of 1-3 parts by weight, the divinylbenzene is used in an amount of 0.3-0.5 part by weight, the dodecylphenol polyoxyethylene ether is used in an amount of 0.2-0.5 part by weight, the initiator is used in an amount of 0.1-0.3 parts by weight, and water is used in an amount of 100-130 parts by weight.

More preferably, the silane coupling agent-modified nanosilica is γ-(methacryloxy) propyl trimethoxy silane-modified nanosilica.

The second aspect of the present disclosure provides a method of preparing the aforementioned water-based drilling fluid, the method comprises the following steps: mixing the nanometer intercalated complex shearing potentiator with water under stirring for 24-48 h, then adding the micro-crosslinked heterocyclic polymer filtrate reducer, the hyper-branched strongly adsorbed fixed filtrate reducer, and the flexible outer and rigid inner microsphere plugging agent in sequence, and blending the materials with stirring.

The third aspect of the present disclosure provides a method of preparing the aforementioned water-based drilling fluid, the method comprises the following steps: mixing the nanometer intercalated complex shearing potentiator with water at a low-speed stirring for at least 24 h, then adding the micro-crosslinked heterocyclic polymer filtrate reducer and blending at a high speed stirring for 10-30 min; further adding the hyper-branched strongly adsorbed filtrate reducer and mixing at a high speed stirring for 10-30 min; subsequently adding the flexible outer and rigid inner microsphere plugging agent and blending at a high speed stirring for 10-30 min; wherein the low-speed stirring has a rotation speed within the range of 1,000-3,000 r/min, and the high-speed stirring has a rotation speed within the range of 8,000-10,000 r/min.

The fourth aspect of the present disclosure provides a use of the aforementioned water-based drilling fluid in drilling well processes in deep or ultra-deep oil and gas formations.

According to the water-based drilling fluid of the present disclosure, a high density environmentally friendly polymer water-based drilling fluid system with resistance to 240° C. and saturated salts is constructed by using a micro-crosslinked heterocyclic polymer filtrate reducer with resistance to ultra-high temperature and saturated salinity (i.e., a micro-crosslinked heterocyclic polymer filtrate reducer), a hyper-branched strongly adsorbed filtrate reducer with resistance to ultra-high temperature and saturated salinity (i.e., a hyper-branched strongly adsorbed filtrate reducer), a nanometer intercalated complex shearing potentiator, and a flexible outer and rigid inner microsphere plugging agent with resistance to ultra-high temperature and saturated salinity (i.e., a flexible outer and rigid inner microsphere plugging agent) as the core ingredients, the water-based drilling fluid system can maintain desirable properties for a long time (more than 10 days) under the conditions of 240° C., saturated salinity (36% NaCl), 5% $CaCl_2$), and 10% KCl.

In the hyper-branched strongly adsorbed filtrate reducer with resistance to ultra-high temperature and saturated salinity, a cation structure can be strongly adsorbed on the surface of clay with negative charges, an anion structure can be strongly adsorbed on the surface of the clay with positive charges, a polyether macromonomer can react with hydroxyl on the clay surface through its alkyl ether structure to form multiple C—O chemical bonds, which have more stable adsorption than other chemical bonds, hydrogen bonds, electrostatic interaction and the like, and the desorption is difficult under the ultra-high temperature condition. In addition, its unique three-dimensional broom-shaped hyper-branched structure molecular chain has better adsorptive power than other molecular chains such as heterocyclic structures and hydrophobic association structures, and has stronger rigidity and larger steric hindrance, thereby ensuring long-time structural stability of the polymer under the condition of ultra-high temperature, and effectively resisting the compression effect of high-valence salt ions on a strong double-electric layer of the molecular chain, enabling the polymer to efficiently keep the spatial stretching state of the molecular chain under the conditions of ultra-high temperature and saturated salinity, further bringing a thicker hydration membrane, having stable performance under the conditions of ultra-high temperature and ultra-high pressure, and saturated salinity, and effectively reducing the filtrate loss.

In the micro-crosslinked heterocyclic polymer filtrate reducer with resistance to ultra-high temperature and saturated salinity, a cation structure can be firmly adsorbed on the clay surface with negative charges, and an anion structure can be solidly adsorbed on the clay end surface with positive charges, and is not easy to desorb under the ultra-high temperature condition. The heterocyclic structure enhances the rigidity and the steric hindrance of a polymer molecular chain, micro-crosslinking may further improve the strength of the polymer molecular chain, reinforce the framework structure in the drilling fluid, greatly improve the hydrolysis resistance of the molecular chain under the ultra-high temperature and high salinity conditions, such that the polymer has a stable structure for a long time under the ultra-high temperature condition, and it brings about a thicker hydration membrane, which ensures the filtrate loss performance under the ultra-high temperature and high salinity conditions, and safeguards the suspension performance of the drilling fluid on weighed materials and drill cuttings.

The outer part of the flexible outer and rigid inner plugging agent is a flexible polymer film, the plugging agent has a large number of heterocyclic rings and benzene ring structures, a strong molecular chain rigidity, and a large steric hindrance, the nano-silica can further enhance the molecular chain rigidity, and maintain the high elasticity and toughness under the condition of ultra-high temperature and saturated salinity, the plugging agent can be self-adapted to the size and shape of mud cakes and gaps in strata, thereby realizing the efficient and compact filling. The internal rigid nano-silica is used as a supporting framework so that the strength of the stratum after blocking with the plugging agent is greatly increased, the filtrate loss of said drilling agent is effectively reduced under the conditions of ultrahigh-temperature and saturated salinity, the pressure transfer is prevented, and the stability of a well wall is maintained.

The nanometer intercalated complex shearing potentiator is a composite material combining an organic polymer and a saline-resistant soil. The salt-resistant soil has a large specific surface area and a strong adsorptive power, a part of high-valence ions in a crystal lamella are replaced by low-valence ions to form a structure with strong electron deficiency and strong electronegativity, and the structure has good dispersibility, thixotropy, suspension property, and high-temperature stability. After a polymer structure with strong electronegativity is inserted into the saline-resistant soil interlayer region, the electronegativity of the saline-resistant soil interlayer region is further improved, and the suspension property and the high-temperature stability are enhanced, thereby efficiently ensuring the suspension of the drilling fluid on a weighed material and drill cuttings under the condition of ultrahigh-temperature and saturated salinity.

According to the water-based drilling fluid of the present disclosure, under the synergistic action of the hyper-branched strongly adsorbed filtrate reducer with resistance to ultra-high temperature and saturated salinity, the micro-crosslinked heterocyclic polymer filtrate reducer with resistance to ultra-high temperature and saturated salinity, and the nanometer intercalated complex shearing potentiator, a firm grid structure resisting the super-high temperature and high mineralization is formed in the drilling fluid, the structure perform the desirable effects of reducing filtrate loss, maintaining good rheology, and suspending weighting materials and drill cuttings for a long time under the conditions of the super-high temperature, high mineralization, and high density; the flexible outer and rigid inner microsphere plugging agent with resistance to ultra-high temperature and saturated salinity further plugs the pores and cracks in the mud cakes and the stratum, reduces the filtrate loss, prevents pressure transmission, and maintains the stability of the borehole wall.

Under the synergistic action of said components, the water-based drilling fluid of the present disclosure can maintain the desirable rheological property and low filtrate loss for a long time (more than 10 days) under the conditions of 240° C., saturated salinity (36% NaCl), 5% $CaCl_2$, and 10% KCl, and exhibit good weighting capability, it can effectively prevent occurrence of the complex accidents of drilling wells such as well collapse, well leakage, and blowout, and the water-based drilling fluid has advantages such as simple preparation process, safe and environment-friendly, and convenient maintenance, the other drilling fluids in the world range cannot produce the properties of the high density environmentally friendly polymer water-based drilling fluid with resistance to 240° C. and saturated salts in the present disclosure.

In addition, the drilling fluid system of the present disclosure does not contain a sulfonated material, does not release toxic malodorous gases under the conditions of high temperature and hypersalinity, has good environmental protection performance, can be popularized and used in regions with strict environmental protection requirements, and can provide technical support for implementing the strategic tasks of drilling wells in the deep and ultra-deep oil and gas formations in China. Moreover, the high-density environmentally friendly polymer water-based drilling fluid with resistance to 240° C. and saturated salts of the present disclosure can be used as completion fluid and work-over fluid of wells in deep oil and gas formations.

DETAILED DESCRIPTION

The specific embodiments of the present disclosure will be described in detail below. It should be understood that the specific embodiments described herein merely serve to illustrate and explain the present disclosure, instead of imposing limitations thereto.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The water-based drilling fluid of the present disclosure comprises a micro-crosslinked heterocyclic polymer filtrate reducer, a hyper-branched strongly adsorbed filtrate reducer, a nanometer intercalated complex shearing potentiator, a flexible outer and rigid inner microsphere plugging agent, and water.

In the water-based drilling fluid, relative to 100 parts by weight of water, the content of said micro-crosslinked heterocyclic polymer filtrate reducer may be 1-10 parts by weight, preferably 2-8 parts by weight, more preferably 3-7 parts by weight, further preferably 4-6 parts by weight; the content of said hyper-branched strongly adsorbed filtrate reducer may be 0.5-8 parts by weight, preferably 1-7 parts by weight, more preferably 1-6 parts by weight, further preferably 2-4 parts by weight; the content of said nanometer intercalated complex shearing potentiator maybe 0.1-6 parts by weight, preferably 0.5-5 parts by weight, more preferably 1-5 parts by weight, further preferably 1-4 parts by weight; the content of said flexible outer and rigid inner microsphere plugging agent maybe 1-15 parts by weight, preferably 2-13 parts by weight, more preferably 4-12 parts by weight, further preferably 6-10 parts by weight.

In the water-based drilling fluid, the micro-crosslinked heterocyclic polymer filtrate reducer is prepared by reacting sodium p-styrene sulfonate, N,N,N-trimethyl-3-(2-methylallylamino)-1-propyl ammonium chloride, N,N-diethyl acrylamide, N-vinyl caprolactam, tetramethyl ethylenediamine with phenyl triethoxy silane.

In a case of preferably, during the preparation process of the micro-crosslinked heterocyclic polymer filtrate reducer, the molar ratio of sodium p-styrene sulfonate, N,N,N-trimethyl-3-(2-methylallylamino)-1-propyl ammonium chloride, N,N-diethyl acrylamide, N-vinyl caprolactam, and tetramethyl ethylenediamine is 1:(0.7-0.9):(0.5-0.7):(0.2-0.4):(0.01-0.03), most preferably 1:0.8:0.6:0.3:0.02.

In a preferred embodiment, the micro-crosslinked heterocyclic polymer filtrate reducer is prepared by a method comprising the following steps:

(1-1) Mixing sodium p-styrene sulfonate, N,N,N-trimethyl-3-(2-methylallylamino)-1-propyl ammonium chloride, N,N-diethyl acrylamide, N-vinyl caprolactam, tetramethyl ethylenediamine, and water to obtain an aqueous solution with a monomer concentration of 20-40 wt %;

(1-2) Blending the aqueous solution with phenyl triethoxy silane under an inert atmosphere, and then introducing an initiator to carry out the reaction.

Further preferably, the phenyl triethoxy silane is used in an amount of 0.05 to 0.2 wt % of the total monomer used in step (1-1).

In step (1-2), the reaction conditions include a temperature of 70-80° C. and a time of 4-6 hours.

In step (1-2), the initiator is preferably a combination of azobisisobutyramidine hydrochloride and a reducing agent. Preferably, the reducing agent is at least one of sodium bisulfite, ammonium bisulfite, and potassium bisulfite, most preferably sodium bisulfite.

In step (1-2), the azodiisobutylamidine hydrochloride is used in an amount of 0.4-0.6 wt % of the total usage of monomers in step (1-1), and the reducing agent is used in an amount of 0.05-0.2 wt % of the total usage of monomers in step (1-1).

In a further preferred embodiment, the preparation method of said micro-crosslinked heterocyclic polymer filtrate reducer comprises the following steps: adding polymerization monomers sodium p-styrene sulfonate, N,N,N-trimethyl-3-(2-methylallylamino)-1-propyl ammonium chloride, N,N-diethyl acrylamide, N-vinyl caprolactam, and tetramethyl ethylenediamine according to a molar ratio of 1:0.8:0.6:0.3:0.02 in water, stirring the polymerization monomers until they are sufficiently dispersed to obtain an aqueous solution with a monomer concentration of 20-40 wt %; transferring the aqueous solution to a three-neck flask, introducing nitrogen gas and heating the three-neck flask to 45° C., adding phenyl triethoxy silane in an amount of 0.1% by mass of the monomers, stirring sufficiently until the phenyl triethoxy silane is dissolved, raising the temperature to 70-80° C., adding azobisisobutyramidine hydrochloride with an amount of 0.5% by mass of the monomers and sodium bisulfite with an amount of 0.1% by mass of the monomers to carry out the reaction, introducing nitrogen gas to perform the constant temperature reaction for 4-6 h; after completion of the reaction, washing the reaction product with acetone for 3-5 times, drying the reaction product in an oven at 80-100° C. for 8-12 h, pulverizing the reaction product to obtain a yellowish powder, which is exactly the micro-crosslinked heterocyclic polymer filtrate reducer.

In the water-based drilling fluid, the hyper-branched strongly adsorbed polymer filtrate reducer is prepared by reacting 2-acrylamido-2-methylpropanesulfonic acid, dimethyldiallyl ammonium chloride, 1-vinylimidazole, modified alkylene polyoxyethylene ether with a branching agent.

In a case of preferably, the molar ratio of 2-acrylamido-2-methylpropanesulfonic acid, dimethyldiallyl ammonium chloride, 1-vinylimidazole, modified alkylene polyoxyethylene ether is 1:(0.4-0.6):(0.2-0.4):(0.04-0.06), most preferably 1:0.5:0.3:0.05, during the preparation process of the hyper-branched strongly adsorbed filtrate reducer.

In a case of preferably, during the preparation process of the hyper-branched strongly adsorbed filtrate reducer, the branching agent is used in an amount of 0.08-0.12 parts by weight, most preferably 0.1 parts by weight, based on 100 parts by weight of the total usage of 2-acrylamido-2-methylpropane e sulfonic acid, dimethyldiallyl ammonium chloride, 1-vinylimidazole, and modified alkylene polyoxyethylene ether.

Preferably, the branching agent is a mixture of branched polyethyleneimine having a molecular weight of 600-2,000 and N,N,N',N'-tetramethyl ethylenediamine. Further preferably, the mass ratio of the branched polyethyleneimine to the N,N,N',N'-tetramethyl ethylenediamine in the branching agent is 1:(0.04-0.06), most preferably 1:0.05.

In a preferred embodiment, the hyper-branched strongly adsorbed filtrate reducer is prepared with a method comprising the following steps:
- (2-1) Mixing 2-acrylamido-2-methylpropanesulfonic acid, dimethyldiallyl ammonium chloride, 1-vinylimidazole, modified alkylene polyoxyethylene ether, and water to obtain an aqueous solution with a monomer concentration of 30-40 wt %;
- (2-2) Subjecting the aqueous solution to the polymerization reaction in the presence of a first initiator under an inert atmosphere;
- (2-3) Blending the mixture obtained after the reaction in step (2-2) with the branching agent, and then introducing a second initiator to carry out the reaction.

In step (2-2), the polymerization reaction conditions may include a temperature of 60-70° C. and a time of 4-5 hours.

In step (2-2), the first initiator may be at least one of potassium persulfate, ammonium persulfate, and sodium persulfate, most preferably potassium persulfate.

In step (2-2), the first initiator may be used in an amount of 0.2-0.4 wt % of the total dosage of polymerization monomers in step (2-1).

In step (2-3), the reaction conditions include a temperature of 80-90° C. and a time of 2-4 hours.

In steps (2-3), the second initiator is preferably azodiisobutylamidine hydrochloride.

In step (2-3), the second initiator may be used in an amount of 0.1-0.3 wt % of the total dosage of polymerization monomers in step (2-1).

In a further preferred embodiment, the preparation method of said hyper-branched strongly adsorbed filtrate reducer comprises the following steps: adding polymerization monomers 2-acrylamido-2-methylpropanesulfonic acid, dimethyldiallyl ammonium chloride, 1-vinylimidazole, and modified alkylene polyoxyethylene ether (PCB7230) according to a molar ratio of 1:0.5:0.3:0.05 in water, stirring the polymerization monomers until they are sufficiently dispersed to obtain an aqueous solution with a monomer concentration of 30-40 wt %; transferring the aqueous solution to a three-neck flask, introducing nitrogen gas and heating the three-neck flask to 60-70° C., adding potassium persulfate at an amount of 0.3% by mass of the monomers to initiate the polymerization reaction, introducing nitrogen gas to perform the constant temperature reaction for 4-5 h; further raising the temperature to 80-90° C., connecting the flask with a condenser tube, adding a branching agent with an amount of 1% by mass of the monomers and azodiisobutylamidine hydrochloride with an amount of 0.2% by mass of the monomers to initiate and continue the reaction for 2-4 h; after completion of the reaction, washing the reaction product with acetone for 3-5 times, drying the reaction product in an oven at 80-100° C. for 8-12 h, pulverizing the reaction product to obtain a white powder, which is exactly the hyper-branched strongly adsorbed filtrate reducer.

In the water-based drilling fluid, the nanometer intercalated complex shearing potentiator is preferably prepared with a method comprising the following steps:
- (3-1) Dispersing nanometer lithium saponite and attapulgite clay according to a mass ratio of 1:(0.2-0.4) in water to obtain a dispersion liquid with a concentration of 5-10%;
- (3-2) Mixing the dispersion liquid, N-isopropyl acrylamide, and maleic anhydride, and then introducing an initiator under an inert atmosphere to perform the reaction.

More preferably, the N-isopropyl acrylamide is used in an amount of 10-20 parts by weight, and the maleic anhydride is used in an amount of 5-15 parts by weight, relative to 100 parts by weight of the dispersion liquid.

In step (3-2), the reaction conditions include a temperature of 50-60° C. and a time of 6-8 hours.

In step (3-2), the initiator may be at least one of ammonium persulfate, sodium persulfate, and potassium persulfate, preferably ammonium persulfate.

In step (3-2), the initiator may be used in an amount of 0.04-0.06% of the total mass of the mixture obtained after mixing the dispersion liquid, N-isopropyl acrylamide, and maleic anhydride.

In a more preferred embodiment, the preparation method of said nanometer intercalated complex shearing potentiator comprises the following steps: blending nanometer lithium saponite and attapulgite clay according to a mass ratio of 1:0.3, subjecting the mixture to the stirring and ultrasonic dispersion in deionized water to formulate a dispersion liquid with a concentration of 8 wt %; adding N-isopropylacrylamide in an amount of 15% of total mass and maleic anhydride in an amount of 10% of total mass to the dispersion liquid, after sufficiently stirring and dispersing the materials, transferring the dispersion liquid to a three-neck flask, introducing nitrogen gas and heating the three-neck flask to 50-60° C., introducing ammonium persulfate in an amount of 0.05% of the total mass to initiate the reaction, introducing nitrogen gas and performing the constant temperature reaction for 6-8 h; after completion of the reaction, washing the reaction product with acetone for 3-5 times, drying the reaction product in an oven at 80-100° C. for 8-12 h, pulverizing the reaction product to obtain a yellowish powder, which is exactly the nanometer intercalated complex shearing potentiator.

In the water-based drilling fluid, the flexible outer and rigid inner microsphere plugging agent is preferably prepared with a method comprising the following steps:
- (4-1) Mixing sodium p-styrene sulfonate, 4-acryloylmorpholine, dodecylphenol polyoxyethylene ether, and water to obtain a mixed aqueous solution;
- (4-2) Blending the mixed aqueous solution with a silane coupling agent-modified nano-silica to obtain mixture a;
- (4-3) Blending α-methyl styrene, lauryl methacrylate, and divinyl benzene to obtain mixture b, subsequently dropwise adding the mixture b to the mixture a with stirring to form an emulsion;
- (4-4) Subjecting the emulsion to a deoxidization process, and then introducing an initiator to carry out the reaction.

More preferably, α-methyl styrene is used in an amount of 10-20 parts by weight, the lauryl methacrylate is used in an amount of 5-10 parts by weight, the sodium p-styrene sulfonate is used in an amount of 5-10 parts by weight, the 4-acryloylmorpholine is used in an amount of 5-10 parts by weight, the silane coupling agent-modified nano-silica is used in an amount of 1-3 parts by weight, the divinylbenzene is used in an amount of 0.3-0.5 part by weight, the dodecylphenol polyoxyethylene ether is used in an amount of 0.2-0.5 part by weight, the initiator is used in an amount of 0.1-0.3 parts by weight, and water is used in an amount of 100-130 parts by weight.

More preferably, the silane coupling agent-modified nanosilica is γ-(methacryloxy) propyl trimethoxy silane-modified nanosilica (i.e., KH-570 modified nanosilica).

In step (4-4), the reaction conditions may include a temperature of 65-75° C. and a time of 6-8 hours.

In step (4-4), the initiator may be at least one of potassium persulfate, ammonium persulfate, and sodium persulfate, most preferably potassium persulfate.

In a more preferred embodiment, the preparation method of said flexible outer and rigid inner microsphere plugging agent comprises the following steps: adding sodium p-styrene sulfonate and 4-acryloylmorpholine to water, stirring till the materials are sufficiently dispersed; adding dodecylphenol polyoxyethylene ether and stirring till the materials are sufficiently dispersed to obtain a mixed aqueous solution; adding a silane coupling agent modified nanosilica to the mixed aqueous solution, stirring and dispersing, then performing the ultrasonic dispersion for 30 minutes, controlling the ultrasonic temperature to below 40° C. to obtain a mixture a; mixing α-methyl styrene, lauryl methacrylate, and divinyl benzene to obtain a mixture b; dropwise adding the mixture b to the mixture a with stirring at a high speed above 500 r/min, keeping the stirring operation for 30 minutes to form an emulsion; transferring the emulsion into a three-neck flask, maintaining the stirring process, removing oxygen gas by introducing nitrogen gas for 30 minutes, raising the temperature to 65-75° C., adding an initiator potassium persulfate, introducing nitrogen gas to carry out the reaction for 6-8 hours; after the reaction is complete, keeping the stirring process, stopping the heating process, discharging the material after the temperature is reduced to 20-30° C., the obtained white emulsion is exactly the flexible outer and rigid inner microsphere plugging agent.

In some embodiments, the preparation method of the water-based drilling fluid in the present disclosure comprises the following steps: mixing the nanometer intercalated complex shearing potentiator with water under stirring for 24-48 h, then adding the micro-crosslinked heterocyclic polymer filtrate reducer, the hyper-branched strongly adsorbed fixed filtrate reducer, and the flexible outer and rigid inner microsphere plugging agent in sequence, and blending the materials with stirring.

In other embodiments, the preparation method of the water-based drilling fluid in the present disclosure comprises the following steps: mixing the nanometer intercalated complex shearing potentiator with water at a low-speed stirring for at least 24 h, then adding the micro-crosslinked heterocyclic polymer filtrate reducer and blending at a high speed stirring for 10-30 min; further adding the hyper-branched strongly adsorbed filtrate reducer and mixing at a high speed stirring for 10-30 min; subsequently adding the flexible outer and rigid inner microsphere plugging agent and blending at a high speed stirring for 10-30 min; wherein the low-speed stirring has a rotation speed within the range of 1,000-3,000 r/min, and the high-speed stirring has a rotation speed within the range of 8,000-10,000 r/min.

The present disclosure also provides a use of the aforementioned water-based drilling fluid in drilling well processes in deep or ultra-deep oil and gas formations. By using the water-based drilling fluids of the present disclosure, the borehole wall destabilization can be avoided, thereby preventing the occurrence of collapse, necking, jammed drilling, and other drilling well accidents, and safeguarding the smooth operation of drilling wells in the deep oil and gas formations.

In practical application process, the high density environmentally friendly polymer water-based drilling fluid with resistance to 240° C. and saturated salts of the present disclosure can maintain desirable rheological property and low filtrate loss for a long time (more than 10 days) under the ultra-high temperature and hyper-salinity conditions consisting of 240° C., saturated salinity (36% NaCl), 5% $CaCl_2$), and 10% KCl, and exhibit good weighting capability, it can effectively prevent occurrence of the complex accidents of drilling wells such as collapse, necking, jammed drilling, and the water-based drilling fluid has advantages such as simple preparation process, safe and environment-friendly, and convenient maintenance, and does not contain a sulfonated material, it does not release toxic malodorous gases under the conditions of high temperature and hypersalinity, has good environmental protection performance, can be popularized and used in regions with strict environmental protection requirements, and can provide technical support for implementing the strategic tasks of drilling wells in the deep and ultra-deep oil and gas formations in China.

The high-density environment-friendly polymer water-based drilling fluid with resistance to 240° C. and saturated salts and a preparation method therefor and applications thereof according to the present disclosure will be further explained below with reference to examples. The examples are implemented under the premise of the technical scheme of the present disclosure, and give the detailed embodiments and specific operation procedure, but the protection scope of the present disclosure is not limited to the examples described below.

Unless otherwise specified, the experimental methods in the following examples are conventional methods in the field. Unless otherwise specified, the experimental materials used in the following examples are commercially available.

Preparation Example 1

Preparation of a micro-crosslinked heterocyclic polymer filtrate reducer with resistance to ultra-high temperature saturated salinity:

1) A total of 30 g of sodium p-styrene sulfonate, N,N,N-trimethyl-3-(2-methylallylamino)-1-propyl ammonium chloride, N,N-diethyl acrylamide, N-vinyl caprolactam, and tetramethyl ethylenediamine were weighed according to a molar ratio of 1:0.8:0.6:0.3:0.02, and then added into 70 g of water, the materials were stirred until they were sufficiently dispersed to obtain an aqueous solution;
2) The aqueous solution was transferred to a three-neck flask, nitrogen gas was introduced and the temperature of said three-neck flask was raised to 45° C., 0.03 g of phenyl triethoxy silane was added, it was sufficiently stirred till it was dissolved, the temperature was raised to 75° C., 0.15 g of azodiisobutylamidine hydrochloride was added to initiate the reaction, the reaction was performed at constant temperature under the protection of nitrogen gas for 5 h;
3) After the reaction was finished, the reaction product was washed with acetone 5 times, the reaction product was dried in an oven at 90° C. for 12 h, and the reaction product was subsequently pulverized to obtain a yellowish powder, which was exactly the micro-crosslinked heterocyclic polymer filtrate reducer.

Preparation Example 2

Preparation of a hyper-branched strongly adsorbed filtrate reducer with resistance to ultra-high temperature and saturated salinity:

1) A total of 35 g of 2-acrylamido-2-methylpropanesulfonic acid, dimethyldiallyl ammonium chloride, 1-vinylimidazole, and modified alkylene polyoxyethylene ether (PCB7230) according to a molar ratio of 1:0.5:0.3:0.05 were added into 70 g of water, the materials were stirred until they were sufficiently dispersed to obtain an aqueous solution;
2) The aqueous solution was transferred to a three-neck flask, which was introduced with nitrogen gas and heated to 65° C., 0.105 g potassium persulfate was added to initiate the polymerization reaction, the nitrogen gas was introduced and the reaction was performed at constant temperature for 5 h;
3) The temperature was further raised to 80-90° C., the flask was connected with a condenser tube, 0.35 g of a branching agent and 0.07 g of azodiisobutylamidine hydrochloride were added to initiate and continue the reaction for 3 h, the branching agent was a mixture of branched polyethyleneimine (purchased from Shanghai Aladdin Biochemical Technology Co., Ltd., under the article number E107078) with a molecular weight of 1,800 and N,N,N',N'-tetramethyl ethylenediamine in a mass ratio of 1:0.05;
4) After the reaction was completed, the reaction product was washed with acetone 5 times, the reaction product was dried in an oven at 90° C. for 10 h, and then pulverized to obtain a white powder, which was exactly the hyper-branched strongly adsorbed filtrate reducer with resistance to ultra-high temperature and saturated salinity.

Preparation Example 3

Preparation of the nanometer intercalated complex shearing potentiator:
1) Nanometer lithium saponite and attapulgite clay were blended according to a mass ratio of 1:0.3, 16 g of the mixture was weighed, stirred, and subjected to ultrasonic dispersion in 200 g of deionized water to formulate a dispersion liquid with a concentration of 8 wt %;
2) 32.4 g N-isopropylacrylamide and 21.6 g of maleic anhydride were added into the dispersion liquid, the materials were sufficiently stirred and dispersed and then transferred to a three-neck flask, nitrogen gas was introduced and the three-neck flask was heated to 55° C., 0.135 g of ammonium persulfate was added to initiate the reaction, nitrogen gas was introduced and the constant temperature reaction was performed for 7 h;
3) After the reaction was completed, the reaction product was washed with acetone 5 times, the reaction product was dried in an oven at 90° C. for 10 h, and then pulverized to obtain a yellowish solid, which was exactly the nanometer intercalated complex shearing potentiator.

Preparation Example 4

Preparation of the flexible outer and rigid inner microsphere plugging agent with resistance to ultra-high temperature and saturated salinity:
The raw materials were weighed by mass as follows: 15 g of α-methyl styrene, 8 g of lauryl methacrylate, 8 g of sodium p-styrene sulfonate, 6 g of 4-acryloylmorpholine, 2 g of KH-570 modified nano-silica (purchased from Jiangsu Xianfeng Nanomaterial Technology Co., Ltd.), 0.3 g of divinyl benzene, 0.3 g of dodecylphenol polyoxyethylene ether, 0.2 g of an initiator potassium persulfate, 120 g of water.
1) Sodium p-styrene sulfonate and 4-acryloylmorpholine were added to water, and stirred until the materials were sufficiently dispersed, dodecylphenol polyoxyethylene ether was then added, stirred until the materials were sufficiently dispersed;
2) KH-570 modified nano-silica was added into the mixed aqueous solution, stirred, and dispersed, the ultrasonic dispersion was subsequently implemented for 30 minutes, and the ultrasonic temperature was controlled below 40° C. to obtain a mixture a;
3) α-methyl styrene, lauryl methacrylate, and divinyl benzene were mixed to obtain a mixture b; said mixture b was dropwise added to said mixture a with stirring at a high speed of 800 r/min, and the stirring was maintained for 30 minutes to form an emulsion;
4) The emulsion was transferred to a three-neck flask, the stirring process was maintained, oxygen gas was removed by introducing nitrogen gas for 30 minutes, the temperature was raised to 70° C., an initiator potassium persulfate was introduced, nitrogen gas was introduced to carry out the reaction for 8 hours; after the reaction was complete, the stirring process was kept, the heating was stopped, the material was discharged after the temperature was reduced to 20-30° C., the obtained white emulsion was exactly the flexible outer and rigid inner microsphere plugging agent with resistance to ultra-high temperature and saturated salinity.

Comparative Preparation Example 1

The polymer filtrate reducer was prepared according to the method of Preparation Example 1, except that phenyl triethoxy silane was not added in step 2), the polymer filtrate reducer A was prepared.

Comparative Preparation Example 2

The polymer filtrate reducer was prepared according to the method of Preparation Example 2, except that step 3) was omitted and the branching agent was used for the further reaction, the reaction product of step 2) was washed and dried directly to obtain the polymer filtrate reducer B.

Comparative Preparation Example 3

The microsphere plugging agent was prepared according to the method of Preparation Example 4, except that KH-570 modified nanosilica was not added, the microsphere plugging agent C was prepared.

Example 1

Raw materials for preparation: 100 parts by weight of water, 5 parts by weight of the micro-crosslinked heterocyclic polymer filtrate reducer with resistance to ultra-high temperature saturated salinity prepared in Preparation Example 1, 3 parts by weight of the hyper-branched strongly adsorbed filtrate reducer with resistance to ultra-high temperature and saturated salinity prepared in Preparation Example 2, 2 parts by weight of the nanometer intercalated complex shearing potentiator prepared in Preparation Example 3, and 8 parts by weight of the flexible outer and rigid inner microsphere plugging agent with resistance to ultra-high temperature and saturated salinity prepared in Preparation Example 4.

Preparation process: water was added to a high speed blender cup, the nanometer intercalated complex shearing potentiator was added at a low speed stirring, the low speed stirring was performed for at least 24 h; the micro-crosslinked heterocyclic polymer filtrate reducer with resistance to ultra-high temperature saturated salinity was added and subjected to a high speed stirring for 20 min; the hyper-branched strongly adsorbed filtrate reducer with resistance to ultra-high temperature and saturated salinity was added and subjected to a high speed stirring for 20 min; the flexible outer and rigid inner microsphere plugging agent with resistance to ultra-high temperature and saturated salinity was added and subjected to a high speed stirring for 20 min, a high density environmentally friendly polymer water-based drilling fluid F1 with resistance to 240° C. and saturated salts was prepared, wherein the rotation speed of the low speed stirring was 2,000 r/min, and the rotation speed of the high speed stirring was 10,000 r/min.

Example 2

Raw materials for preparation: 100 parts by weight of water, 6 parts by weight of the micro-crosslinked heterocyclic polymer filtrate reducer with resistance to ultra-high temperature saturated salinity prepared in Preparation Example 1, 4 parts by weight of the hyper-branched strongly adsorbed filtrate reducer with resistance to ultra-high temperature and saturated salinity prepared in Preparation Example 2, 4 parts by weight of the nanometer intercalated complex shearing potentiator prepared in Preparation Example 3, and 10 parts by weight of the flexible outer and rigid inner microsphere plugging agent with resistance to ultra-high temperature and saturated salinity prepared in Preparation Example 4.

The preparation process was the same as that in Example 1, a high-density environmentally-friendly polymer water-based drilling fluid F2 with resistance to 240° C. and saturated salts was prepared.

Example 3

Raw materials for preparation: 100 parts by weight of water, 4 parts by weight of the micro-crosslinked heterocyclic polymer filtrate reducer with resistance to ultra-high temperature saturated salinity prepared in Preparation Example 1, 2 parts by weight of the hyper-branched strongly adsorbed filtrate reducer with resistance to ultra-high temperature and saturated salinity prepared in Preparation Example 2, 1 part by weight of the nanometer intercalated complex shearing potentiator prepared in Preparation Example 3, and 6 parts by weight of the flexible outer and rigid inner microsphere plugging agent with resistance to ultra-high temperature and saturated salinity prepared in Preparation Example 4.

The preparation process was the same as that in Example 1, a high-density environmentally-friendly polymer water-based drilling fluid F3 with resistance to 240° C. and saturated salts was prepared.

Comparative Example 1

The water-based drilling fluid was prepared according to the method of Example 1, except that the micro-crosslinked heterocyclic polymer filtrate reducer with resistance to ultra-high temperature saturated salinity was not added, the water-based drilling fluid DF1 was prepared.

Comparative Example 2

The water-based drilling fluid was prepared according to the method of Example 1, except that the hyper-branched strongly adsorbed filtrate reducer with resistance to ultra-high temperature and saturated salinity was not added, the water-based drilling fluid DF2 was prepared.

Comparative Example 3

The water-based drilling fluid was prepared according to the method of Example 1, except that the flexible outer and rigid inner microsphere plugging agent with resistance to ultra-high temperature and saturated salinity was not added, the water-based drilling fluid DF3 was prepared.

Comparative Example 4

The water-based drilling fluid was prepared according to the method of Example 1, except that the micro-crosslinked heterocyclic polymer filtrate reducer with resistance to ultra-high temperature saturated salinity and the hyper-branched strongly adsorbed filtrate reducer with resistance to ultra-high temperature and saturated salinity were replaced by an equivalent part by weight of sulfonate copolymer filtrate reducer DSP-1.

Preparation process: water was added to a high-speed blender cup, the nanometer intercalated complex shearing potentiator was added at a low-speed stirring, the low-speed stirring was performed for at least 24 h; the sulfonate copolymer filtrate reducer DSP-1 was added and subjected to a high-speed stirring for 20 min; the flexible outer and rigid inner microsphere plugging agent with resistance to ultra-high temperature and saturated salinity was added and subjected to a high speed stirring for 20 min, a water-based drilling fluid DF4 was prepared, wherein the rotation speed of the low-speed stirring was 2,000 r/min, and the rotation speed of the high-speed stirring was 10,000 r/min.

Comparative Example 5

The water-based drilling fluid was prepared according to the method of Example 1, except that the micro-crosslinked heterocyclic polymer filtrate reducer with resistance to ultra-high temperature saturated salinity was replaced by the polymer filtrate reducer A prepared in Comparative Preparation Example 1, the water-based drilling fluid DF5 was prepared.

Comparative Example 6

The water-based drilling fluid was prepared according to the method of Example 1, except that the hyper-branched strongly adsorbed filtrate reducer with resistance to ultra-high temperature and saturated salinity was replaced by the polymer filtrate reducer B prepared in Comparative Preparation Example 2, the water-based drilling fluid DF6 was prepared.

Comparative Example 7

The water-based drilling fluid was prepared according to the method of Example 1, except that the flexible outer and rigid inner microsphere plugging agent with resistance to ultra-high temperature and saturated salinity was replaced by the microsphere plugging agent C prepared in Comparative Preparation Example 3, the water-based drilling fluid DF7 was prepared.

Test Example 1

400 mL of the two groups of water-based drilling fluids F1-F3 and DF1-DF7 were weighed, barite was used for increasing weight of said water-based drilling fluids to a density of 1.8 g/cm³, the saturated salt (36% NaCl) and the composite salt (15% NaCl+5% CaCl₂+10% KCl) were added respectively, and subjected to stirring at a rotation speed of 5,000 r/min for 20 min, the water-based drilling fluids were loaded into the aging tanks, which were placed in a roller furnace, and rolled at the constant temperature of 240° C. for 16 hours, the aging tanks were then taken out and cooled to room temperature, and further stirred at a rotation speed of 5,000 rpm for 20 min, the apparent viscosity (AV, mPa·s), plastic viscosity (PV, mPa·s), dynamic shear force (YP, Pa), API filtrate loss FL$_{API}$, High Temperature High Pressure (HTHP) filtrate loss FL$_{HTHP}$ (240° C.) of the drilling fluids were measured according to the petroleum and natural gas industry standard GB/T16783.1-2014 in China, namely "Petroleum and natural gas industries—Field testing of drilling fluids-Part 1: water-based drilling fluid", the test results were shown in Table 1 and Table 2.

TABLE 1

Water-based drilling fluid performance testing (saturated salt)

| Drilling fluids | AV, mPa·s | PV, mPa·s | YP, Pa | FL$_{API}$, mL | FL$_{HTHP240°C}$, mL |
|---|---|---|---|---|---|
| F1 | 54 | 44 | 10 | 1.2 | 11.6 |
| F2 | 49 | 40 | 9 | 1.6 | 13.2 |
| F3 | 60 | 48 | 12 | 0.6 | 9.8 |
| DF1 | 40 | 34 | 6 | 4.4 | 54.6 |
| DF2 | 48 | 40 | 8 | 3.2 | 29.8 |
| DF3 | 53 | 43 | 10 | 2.4 | 24.8 |
| DF4 | 74 | 56 | 18 | 4.8 | 68.6 |
| DF5 | 49 | 43 | 6 | 3.2 | 23.2 |
| DF6 | 48 | 43 | 5 | 3.6 | 21.4 |
| DF7 | 51 | 42 | 9 | 2.0 | 20.2 |

TABLE 2

Water-based drilling fluid performance testing (composite salt)

| Drilling fluids | AV, mPa·s | PV, mPa·s | YP, Pa | FL$_{API}$, mL | FL$_{HTHP240°C}$, mL |
|---|---|---|---|---|---|
| F1 | 53 | 43.5 | 9.5 | 1.6 | 12.4 |
| F2 | 47 | 39 | 8 | 1.8 | 13.6 |
| F3 | 59 | 48.5 | 10.5 | 1.0 | 10.6 |
| DF1 | 36 | 32 | 4 | 6.8 | 62.6 |
| DF2 | 44 | 38 | 6 | 5.0 | 37.4 |
| DF3 | 50.5 | 44 | 6.5 | 3.6 | 30.8 |
| DF4 | 66 | 56 | 10 | 4.8 | 91.2 |
| DF5 | 45 | 40 | 5 | 3.8 | 27.0 |
| DF6 | 45 | 40.5 | 4.5 | 3.2 | 25.4 |
| DF7 | 50 | 43 | 7 | 2.8 | 23.8 |

As can be seen from the above data, the high-density environment environmentally friendly polymer water-based drilling fluid with resistance to 240° C. and saturated salts according to the present disclosure has desirable rheological and filtrate loss properties, the high-temperature and high-pressure filtrate loss under the conditions of high temperature of 240° C. and saturated salinity is only 9.8 mL, and the high temperature and high pressure filtrate loss under the conditions of high temperature of 240° C., and severe hypersalinity of composite salts composed of 15% NaCl+ 5% CaCl₂)+10% KCl is merely 10.6 mL. The properties of said water-based frilling fluid will be substantially degraded due to the absence of key components, or the preparation process of key materials differs from the present disclosure, it demonstrates that only the water-based drilling fluids obtained according to the components, matching ratios, and preparation method of the present disclosure can perform the superior properties.

Test Example 2

The water-based drilling fluids F1-F3 and DF1-DF7 were subjected to the sand bed plugging and rock core plugging performance testing.

400 mL of the water-based drilling fluids F1-F3 and DF1-DF7 were weighed, barite was used for increasing the weight of said water-based drilling fluids to a density of 1.8 g/cm³, the composite salt consisting of 15% NaCl+5% CaCl₂)+10% KCl was added, and subjected to stirring at a rotation speed of 5,000 r/min, the water-based drilling fluids were loaded into the aging tanks, which were placed in a roller furnace, and rolled at the constant temperature of 240° C. for 16 hours, the aging tanks were then taken out and cooled to room temperature, and further stirred at a rotation speed of 5,000 rpm for 20 min, to obtain the drilling fluids to be tested.

The instrument used in the sand bed filtrate loss test was a visual medium pressure sand bed plugging device, the sand in use had a particle size of 80-100 mesh, the specific steps were as follows: 350 mL of sand was loaded into a sand filter tube and packed evenly; 200 mL of the drilling fluid to be tested was added to the top of the sand, the gland was fastened down, and the gland opening was encapsulated with a sealing ring; a measuring cylinder with a certain specification was placed underneath the sand filter tube to measure the filtration loss, the total gas valve of the nitrogen cylinder was first opened to provide the gas supply, when the numerical value of the pressure gauge attached to the upper end of the gland was increased to 100 psi and stabilized, the valve between said pressure gauge and said gland was then opened to introduce gas, after 30 min measured with a stopwatch, the filtrate loss (the filtrate loss was denoted by the penetration depth of the sand bed or the volume of filtration loss) in the measuring cylinder was recorded, the results were shown in Table 2.

The rock core plugging rate was tested according to the following method: an initial forward direction standard brine permeability $K_1$ of a rock sample was measured on a core flow tester by using a drilling fluid contamination holder. The core contamination holder was then taken down, and connected to a drilling fluid high-temperature high-pressure dynamic comprehensive tester, the rock sample was plugged with the drilling fluid along the forward direction, and the temperature of said drilling fluid was 80° C., and the pressure differential was 3.5 MPa, a confining pressure was 5 MPa, and the shearing rate was 150 s⁻¹. After 30 min of the damage time, the core contamination holder was then taken down and connected to the core flow tester, a rock core forward direction standard brine permeability $K_2$ was measured, and the rock core plugging rate was calculated according to the following formula. The results were shown in Table 3.

$$R = \left(1 - \frac{K_2}{K_1}\right) \times 100\%$$

TABLE 3

Plugging performance test of the drilling fluids

| Drilling fluids | Sand bed invasion depth/cm | Rock core plugging rate/% |
|---|---|---|
| F1 | 1.2 | 94.8 |
| F2 | 1.6 | 92.6 |
| F3 | 0.8 | 96.5 |
| DF1 | 4.6 | 86.4 |
| DF2 | 3.8 | 87.2 |
| DF3 | 6.8 | 74.4 |
| DF4 | 5.5 | 79.8 |
| DF5 | 3.2 | 88.4 |
| DF6 | 3.5 | 87.9 |
| DF7 | 3.9 | 86.8 |

As illustrated by Table 3, the high density environmentally friendly polymer water-based drilling fluid with resistance to 240° C. and saturated salts of the present disclosure has superior plugging properties, the sand bed invasion depth is as low as 0.8 cm, and the rock core plugging rate reaches a high level of 96.5%.

Test Example 3

The water-based drilling fluids F1-F3 were subjected to the weighting capability test.

400 mL of the water-based drilling fluids F1-F3 were weighed, barite was used for increasing the weight of said water-based drilling fluids to the density of 2.0 g/cm$^3$, 2.2 g/cm$^3$, and 2.4 g/cm$^3$ respectively, the composite salt consisting of 15% NaCl, 5% CaCl$_2$, and 10% KCl was added, and subjected to stirring at a rotation speed of 5,000 r/min for 20 min, the water-based drilling fluids were loaded into the aging tanks, which were placed in a roller furnace, and rolled at the constant temperature of 240° C. for 16 hours, the aging tanks were then taken out and cooled to room temperature, and further stirred at a rotation speed of 5,000 rpm for 20 min, the drilling fluids to be tested were obtained. The apparent viscosity (AV, mPa·s), plastic viscosity (PV, mPa·s), dynamic shear force (YP, Pa), API filtrate loss FLAPI, High-Temperature High-Pressure (HTHP) filtrate loss FLHTHP (240° C.) of the drilling fluids to be tested were subsequently measured according to the petroleum and natural gas industry standard GB/T16783.1-2014 in China, namely "Petroleum and natural gas industries—Field testing of drilling fluids-Part 1: water-based drilling fluid", the test results were shown in Table 4.

TABLE 4

Weighting capability test of the drilling fluids

| Density/ (g/cm$^3$) | Drilling fluids | AV, mPa·s | PV, mPa·s | YP, Pa | FL$_{API}$, mL | FL$_{HTHP240°C}$, mL |
|---|---|---|---|---|---|---|
| 2.0 | F1 | 70 | 54.5 | 15.5 | 1.4 | 14.4 |
|  | F2 | 68 | 56 | 12 | 2.2 | 15.8 |
|  | F3 | 74 | 58 | 16 | 1.4 | 12.6 |
| 2.2 | F1 | 78 | 61 | 17 | 2.4 | 17.2 |
|  | F2 | 75.5 | 61.5 | 14 | 2.6 | 18.4 |
|  | F3 | 81.5 | 63 | 18.5 | 2.0 | 16.8 |
| 2.4 | F1 | 93 | 64 | 29 | 2.6 | 18.8 |
|  | F2 | 90 | 63.5 | 26.5 | 2.8 | 19.6 |
|  | F3 | 96.5 | 66 | 30.5 | 2.4 | 18.2 |

As illustrated by Table 4, the drilling fluids maintain good rheological and filtrate loss properties under the density conditions of 2.0 g/cm$^3$, 2.2 g/cm$^3$, and 2.4 g/cm$^3$, indicating that the drilling fluids have desirable weighting capability.

Test Example 4

The water-based drilling fluids F1-F3 were subjected to the long-term aging test.

400 mL of the water-based drilling fluids F1-F3 were weighed, barite was used for increasing weight of said water-based drilling fluids to the density of 1.8 g/cm$^3$, the composite salt consisting of 15% NaCl, 5% CaCl$_2$) and 10% KCl was added, and subjected to stirring at a rotation speed of 5,000 r/min for 20 min, the water-based drilling fluids were loaded into the aging tanks, which were placed in a roller furnace, and rolled at the constant temperature of 240° C. for 3 days, 5 days, and 10 days, the aging tanks were then taken out and cooled to room temperature, and further stirred at a rotation speed of 5,000 rpm for 20 min, the drilling fluids to be tested were obtained. The apparent viscosity (AV, mPa·s), plastic viscosity (PV, mPa·s), dynamic shear force (YP, Pa), API filtrate loss FLAPI, High-Temperature High-Pressure (HTHP) filtrate loss FLHTHP (240° C.) of the drilling fluids to be tested were subsequently measured according to the petroleum and natural gas industry standard GB/T16783.1-2014 in China, namely "Petroleum and natural gas industries—Field testing of drilling fluids-Part 1: water-based drilling fluid", the test results were shown in Table 5.

TABLE 5

Long-time aging test of the drilling fluids

| Ageing time | Drilling fluids | AV, mPa·s | PV, mPa·s | YP, Pa | FL$_{API}$, mL | FL$_{HTHP240°C}$, mL |
|---|---|---|---|---|---|---|
| 3 days | F1 | 44 | 38.5 | 5.5 | 2.4 | 14.2 |
|  | F2 | 38 | 34 | 4 | 2.6 | 15.6 |
|  | F3 | 48.5 | 42 | 6.5 | 1.8 | 12.4 |
| 5 days | F1 | 42 | 38 | 4 | 2.6 | 16.6 |
|  | F2 | 36 | 32.5 | 3.5 | 2.8 | 17.2 |
|  | F3 | 46 | 41 | 5 | 2.2 | 14.8 |
| 10 days | F1 | 40 | 36 | 4 | 2.8 | 18.6 |
|  | F2 | 32 | 29 | 3 | 3.4 | 19.2 |
|  | F3 | 45 | 40.5 | 4.5 | 2.2 | 17.8 |

As can be seen from Table 5, the viscosity of the drilling fluid system slightly decreases along with an increase in the aging time, but the drilling fluid system can still maintain the desirable shearing force, indicating that the drilling fluids still have good grid structural strength. Furthermore, the drilling fluids retain a low filtrate loss at all times, with a high temperature and high-pressure filtrate loss of only 17.8 mL after aging for 10 days at 240° C., indicating that the drilling fluids have a long-term stability.

Test Example 5

Environmental protection performance evaluation of the water-based drilling fluids F1-F3 was implemented according to the petroleum and natural gas industry standard SY/T6788-2020 in China, namely "Evaluation procedures of environmental protection for water-soluble oilfield chemicals", the luminescent bacteria method for bio-toxicity EC50 and the biological degradability BOD/CODer were tested, the test results were shown in Table 6.

TABLE 6

| Luminescent bacteria method for bio-toxicity EC50 | | |
|---|---|---|
| Drilling fluids | EC50/mg/L | BOD/COD$_{cr}$ |
| F1 | 57000 | 0.34 |
| F2 | 62000 | 0.38 |
| F3 | 52000 | 0.31 |

As can be seen from Table 6, the high-density environmentally friendly polymer water-based drilling fluid with resistance to 240° C. and saturated salts has excellent biocompatibility and meets the environmental requirements.

To sum up, the high density environmentally friendly polymer water-based drilling fluid with resistance to 240° C. and saturated salts of the present disclosure can exhibit good performance at high temperature and high salinity conditions, and has desirable weighting capability, it can meet the requirements of drilling well in the deep oil and gas formations.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A water-based drilling fluid comprising a micro-crosslinked heterocyclic polymer filtrate reducer, a hyper-branched strongly adsorbed filtrate reducer, a nanometer intercalated complex shearing potentiator, a flexible outer and rigid inner microsphere plugging agent, and water, wherein the micro-crosslinked heterocyclic polymer filtrate reducer is prepared by reacting sodium p-styrene sulfonate, N,N,N-trimethyl-3-(2-methylallylamino)-1-propyl ammonium chloride, N,N-diethyl acrylamide, N-vinyl caprolactam, and tetramethyl ethylenediamine with phenyl triethoxy silane; the hyper-branched strongly adsorbed polymer filtrate reducer is prepared by reacting 2-acrylamido-2-methylpropanesulfonic acid, dimethyldiallyl ammonium chloride, 1-vinylimidazole, and a modified alkylene polyoxyethylene ether with a branching agent.

2. The water-based drilling fluid of claim 1, wherein the content of said micro-crosslinked heterocyclic polymer filtrate reducer is 1-10 parts by weight, the content of said hyper-branched strongly adsorbed filtrate reducer is 0.5-8 parts by weight, the content of said nanometer intercalated complex shearing potentiator is 0.1-6 parts by weight, and the content of said flexible outer and rigid inner microsphere plugging agent is 1-15 parts by weight, relative to 100 parts by weight of water.

3. The water-based drilling fluid of claim 2, wherein the content of said micro-crosslinked heterocyclic polymer filtrate reducer is 4-6 parts by weight, the content of said hyper-branched strongly adsorbed filtrate reducer is 2-4 parts by weight, the content of said nanometer intercalated complex shearing potentiator is 1-4 parts by weight, and the content of said flexible outer and rigid inner microsphere plugging agent is 6-10 parts by weight, relative to 100 parts by weight of water.

4. The water-based drilling fluid of claim 1, wherein the molar ratio of sodium p-styrene sulfonate, N,N,N-trimethyl-3-(2-methylallylamino)-1-propyl ammonium chloride, N,N-diethyl acrylamide, N-vinyl caprolactam, and tetramethyl ethylenediamine is 1:(0.7-0.9):(0.5-0.7):(0.2-0.4):(0.01-0.03), during the preparation process of the micro-crosslinked heterocyclic polymer filtrate reducer.

5. The water-based drilling fluid of claim 4, wherein the micro-crosslinked heterocyclic polymer filtrate reducer is prepared by a method comprising the following steps:
(1-1) Mixing sodium p-styrene sulfonate, N,N,N-trimethyl-3-(2-methylallylamino)-1-propyl ammonium chloride, N,N-diethyl acrylamide, N-vinyl caprolactam, tetramethyl ethylenediamine, and water to obtain an aqueous solution with a monomer concentration of 20-40 wt %;
(1-2) Blending the aqueous solution with phenyl triethoxy silane under an inert atmosphere, and then introducing an initiator to carry out the reaction.

6. The water-based drilling fluid of claim 5, wherein the phenyl triethoxy silane is used in an amount of 0.05-0.2 wt % of the total usage of monomer in step (1-1).

7. The water-based drilling fluid of claim 1, wherein the molar ratio of 2-acrylamido-2-methylpropanesulfonic acid, dimethyldiallyl ammonium chloride, 1-vinylimidazole, and modified alkylene polyoxyethylene ether is 1:(0.4-0.6):(0.2-0.4):(0.04-0.06), during the preparation process of the hyper-branched strongly adsorbed filtrate reducer.

8. The water-based drilling fluid of claim 7, wherein during the preparation process of the hyper-branched strongly adsorbed filtrate reducer, the branching agent is used in an amount of 0.08-0.12 parts by weight, based on 100 parts by weight of the total usage of 2-acrylamido-2-methylpropane sulfonic acid, dimethyldiallyl ammonium chloride, 1-vinylimidazole, and modified alkylene polyoxyethylene ether.

9. The water-based drilling fluid of claim 8, wherein branching agent is a mixture of branched polyethyleneimine having a molecular weight of 600-2,000 and N,N,N',N'-tetramethyl ethylenediamine.

10. The water-based drilling fluid of claim 9, wherein the mass ratio of the branched polyethyleneimine to the N,N,N',N'-tetramethyl ethylenediamine in the branching agent is 1:(0.04-0.06).

11. The water-based drilling fluid of claim 7, wherein the hyper-branched strongly adsorbed filtrate reducer is prepared with a method comprising the following steps:
(2-1) Mixing 2-acrylamido-2-methylpropanesulfonic acid, dimethyldiallyl ammonium chloride, 1-vinylimidazole, modified alkylene polyoxyethylene ether, and water to obtain an aqueous solution with a monomer concentration of 30-40 wt %;
(2-2) Subjecting the aqueous solution to the polymerization reaction in the presence of a first initiator under an inert atmosphere;
(2-3) Blending the mixture obtained after the reaction in step (2-2) with the branching agent, and then introducing a second initiator to carry out the reaction.

12. The water-based drilling fluid of claim 1, wherein the nanometer intercalated complex shearing potentiator is prepared with a method comprising the following steps:
(3-1) Dispersing nanometer lithium saponite and attapulgite clay according to a mass ratio of 1:(0.2-0.4) in water to obtain a dispersion liquid with a concentration of 5-10%;
(3-2) Mixing the dispersion liquid, N-isopropyl acrylamide, and maleic anhydride, and then introducing an initiator under an inert atmosphere to perform the reaction.

13. The water-based drilling fluid of claim 12, wherein the N-isopropyl acrylamide is used in an amount of 10-20 parts by weight, and the maleic anhydride is used in an amount of 5-15 parts by weight, relative to 100 parts by weight of the dispersion liquid.

14. The water-based drilling fluid of claim 1, wherein the flexible outer and rigid inner microsphere plugging agent is prepared with a method comprising the following steps:
   (4-1) Mixing sodium p-styrene sulfonate, 4-acryloylmorpholine, dodecylphenol polyoxyethylene ether, and water to obtain a mixed aqueous solution;
   (4-2) Blending the mixed aqueous solution with a silane coupling agent-modified nano-silica to obtain mixture a;
   (4-3) Blending α-methyl styrene, lauryl methacrylate, and divinyl benzene to obtain mixture b, subsequently dropwise adding the mixture b to the mixture a with stirring to form an emulsion;
   (4-4) subjecting the emulsion to a deoxidization process, and then introducing an initiator to carry out the reaction.

15. The water-based drilling fluid of claim 14, wherein α-methyl styrene is used in an amount of 10-20 parts by weight, the lauryl methacrylate is used in an amount of 5-10 parts by weight, the sodium p-styrene sulfonate is used in an amount of 5-10 parts by weight, the 4-acryloylmorpholine is used in an amount of 5-10 parts by weight, the silane coupling agent-modified nano-silica is used in an amount of 1-3 parts by weight, the divinylbenzene is used in an amount of 0.3-0.5 part by weight, the dodecylphenol polyoxyethylene ether is used in an amount of 0.2-0.5 part by weight, the initiator is used in an amount of 0.1-0.3 parts by weight, and water is used in an amount of 100-130 parts by weight.

16. The water-based drilling fluid of claim 14, wherein the silane coupling agent-modified nanosilica is γ-(methacryloxy) propyl trimethoxy silane-modified nanosilica.

17. A method of preparing the water-based drilling fluid of claim 1, wherein the method comprises the following steps: mixing the nanometer intercalated complex shearing potentiator with water under stirring for 24-48 h, then adding the micro-crosslinked heterocyclic polymer filtrate reducer, the hyper-branched strongly adsorbed fixed filtrate reducer, and the flexible outer and rigid inner microsphere plugging agent in sequence, and blending the materials with stirring; or
   the method comprises the following steps: mixing the nanometer intercalated complex shearing potentiator with water at a low-speed stirring for at least 24 h, then adding the micro-crosslinked heterocyclic polymer filtrate reducer and blending at a high speed stirring for 10-30 min; further adding the hyper-branched strongly adsorbed filtrate reducer and mixing at a high speed stirring for 10-30 min; subsequently adding the flexible outer and rigid inner microsphere plugging agent and blending at a high speed stirring for 10-30 min;
   wherein the low-speed stirring has a rotation speed within the range of 1,000-3,000 r/min, and the high-speed stirring has a rotation speed within the range of 8,000-10,000 r/min.

18. A process of drilling a well in oil and gas formations, comprising drilling the well using the water-based drilling fluid of claim 1.

* * * * *